(No Model.)
G. CLAFLIN.
SCOOP AND FORK.
No. 255,254. Patented Mar. 21, 1882.
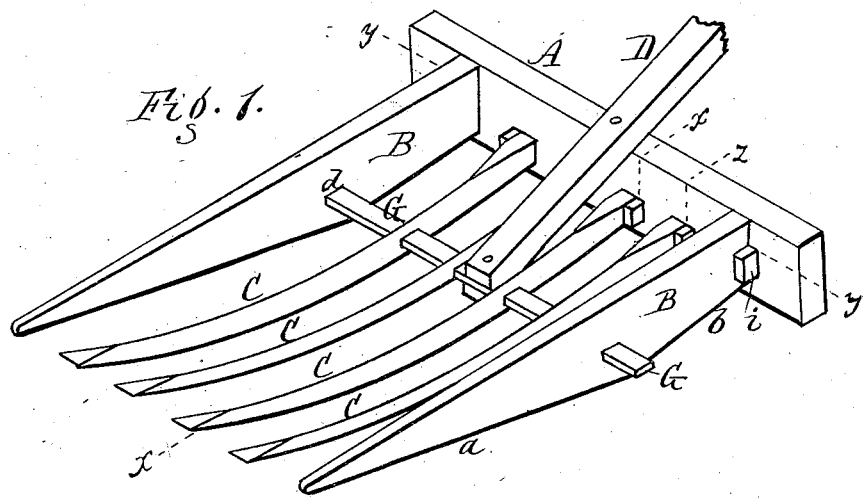
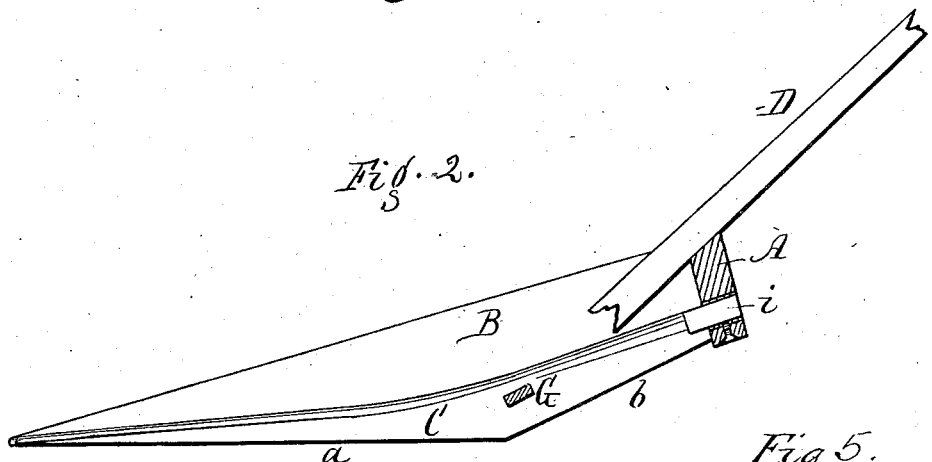
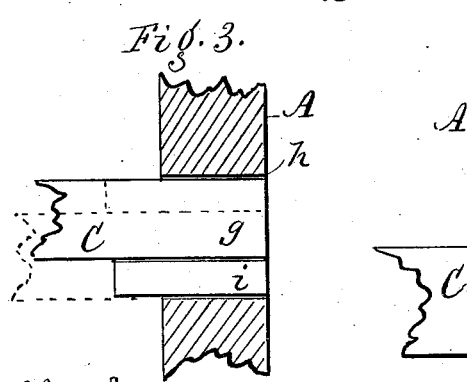
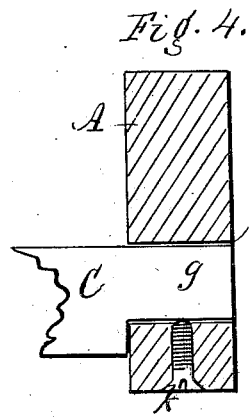
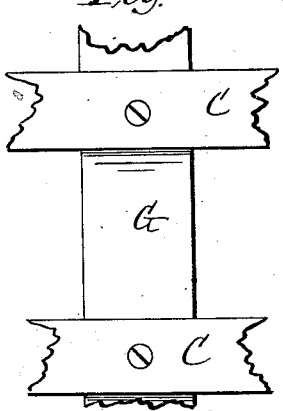
Attest.
Inventor.
Geo Claflin
per R. L. Osgood,
atty.

UNITED STATES PATENT OFFICE.

GEORGE CLAFLIN, OF MILLER'S CORNERS, NEW YORK.

SCOOP AND FORK.

SPECIFICATION forming part of Letters Patent No. 255,254, dated March 21, 1882.

Application filed December 12, 1881. (No model.)

*To all whom it may concern:*

Be it known that I, GEORGE CLAFLIN, of Miller's Corners, Ontario county, New York, have invented a certain new and useful Improvement in Scoops and Forks; and I do hereby declare that the following is a full, clear, and exact description of the same, reference being had to the accompanying drawings, in which—

Figure 1 is a perspective view of the device. Fig. 2 is a section in line $x\ x$, showing the device on an enlarged scale. Fig. 3 is a section in line $y\ y$. Fig. 4 is a section in line $z\ z$. Fig. 5 is a bottom view, showing a fragment of two of the tines and the cross connecting-piece.

My improvement relates to scoops and forks for agricultural purposes, such as picking or shoveling potatoes and other vegetables, and the design is also to combine with the function of a scoop that of an assorter, so that the articles handled may be separated in different sizes.

The invention consists in the construction and arrangement of the device as hereinafter more fully described.

In the drawings, A represents a head, to which are attached two side pieces or guards, B B, and a series of tines, C C C, which project forward and form the scoop, and a handle, D, by which the device is operated like a common shovel or agricultural fork. The parts may be made either of wood or metal, but preferably of wood for all ordinary purposes. The guards B B are made of considerable width, being straight-edged on top, but beveled on the bottom, forming two planes, $a\ b$, one of which, in the act of shoveling, rests flat on the ground, while the other points upward and backward to facilitate the action upon the handle. The tines also at the bottom coincide with the shape of the guards; but they are made much narrower vertically than the guards, so that their tops are curved and stand below the level of the guards, their outer ends, however, standing in the same line. By this means the body of the device is made hollow and of scoop form, constituting a receptacle for holding any material which is shoveled up.

G is a cross-piece, forming a brace, which passes through sockets $d\ d$ in the guards and tines, some distance in advance of the head, said cross-piece serving as a stiffener or brace to keep the parts in place. This cross-piece may be oblong or circular in cross-section, and the tines and guards are fastened to it by means of set-screws, (shown in the bottom view, Fig. 5.)

$g\ g$ are tenons formed on the rear ends of the guards and tines, and resting in sockets $h\ h$ of the head A. In case of making the scoop an assorter, the sockets are made much wider horizontally than the tenons, so that keys $i\ i$ can be inserted in the sockets on one side or the other of the tenons. When the guards and tines are adjusted in a desired position they are clamped in place to the head by means of set-screws $k\ k$, which pass up from the under side into the head and bear against the tenons. If desired, double tenons may be used on the guards. The handle has a cleft lower end, which fits on and embraces the cross-piece G, and it is secured to the top of the head by a screw or bolt, $m$.

For ordinary use, where no assorting is required, the guards and tines may be secured fast, and no change will be required; but for assorting purposes the tines may be adjusted nearer together or farther apart by loosening the set-screws in the head and the cross piece, removing the keys in the sockets, and shifting them to the opposite sides of the tenons. It is also necessary to correspondingly move the side guards in and out. When properly adjusted to the desired gage the set-screws are driven in again and the parts made fast.

By the means above described the guards and fingers can be so adjusted as to assort potatoes and other vegetables with great facility and accuracy. The large ones are retained in the scoop, while the small ones pass through. This device has been used with great success in picking potatoes in the field.

The device above described is not only applicable for picking and shoveling potatoes, apples, &c., but for many other uses, agricultural and otherwise. I desire to cover it for any and all purposes to which it is applicable.

Having thus described my invention, what I claim as new, and desire to secure by Letters Patent, is—

1. The combined scoop and assorter herein described, consisting of the head A, side guards, B B, tines or fingers C C, cross-piece G, and handle D, the guards and tines provided with tenons fitting in sockets in the head, adjustable to different positions therein, and secured by shifting keys $i\ i$, as shown and described, and for the purpose specified.

2. In combination with the guards B B and tines C C, provided with tenons resting in sockets of the head-piece, the keys $i\ i$, fitted in the sockets and capable of being shifted to either side of the tenons for the purpose of adjusting the guards and tines, as herein shown and described.

In witness whereof I have hereunto signed my name in the presence of two subscribing witnesses.

GEORGE CLAFLIN.

Witnesses:
R. F. OSGOOD,
C. F. SPENCER.